(12) United States Patent
Jordan

(10) Patent No.: US 11,577,736 B2
(45) Date of Patent: Feb. 14, 2023

(54) METHOD AND DEVICE FOR ASCERTAINING A HIGHLY ACCURATE ESTIMATED VALUE OF A YAW RATE FOR CONTROLLING A VEHICLE

(71) Applicant: Robert Bosch GmbH, Stuttgart (DE)

(72) Inventor: Alexander Jordan, Ranschbach (DE)

(73) Assignee: Robert Bosch GmbH, Stuttgart (DE)

( * ) Notice: Subject to any disclaimer, the term of this patent is extended or adjusted under 35 U.S.C. 154(b) by 299 days.

(21) Appl. No.: 17/007,933

(22) Filed: Aug. 31, 2020

(65) Prior Publication Data

US 2021/0094556 A1 Apr. 1, 2021

(30) Foreign Application Priority Data

Sep. 30, 2019 (DE) .......................... 102019215026.8

(51) Int. Cl.
*B60W 40/114* (2012.01)
*B60W 50/04* (2006.01)

(52) U.S. Cl.
CPC ........ *B60W 40/114* (2013.01); *B60W 50/045* (2013.01); *B60W 2520/14* (2013.01)

(58) Field of Classification Search
CPC ............. B60W 40/114; B60W 50/045; B60W 2520/14; B60W 2420/42; B60W 2520/28; B60W 2540/18; B60W 2556/50
See application file for complete search history.

(56) References Cited

U.S. PATENT DOCUMENTS

| 2015/0025771 A1* | 1/2015 | Seo ...................... G01C 25/005 |
| | | 701/96 |
| 2015/0166062 A1* | 6/2015 | Johnson ................ B60W 10/20 |
| | | 701/41 |
| 2016/0244069 A1 | 8/2016 | Bajpai |
| 2019/0033459 A1* | 1/2019 | Tisdale .................. G06V 20/56 |

FOREIGN PATENT DOCUMENTS

DE     102017205973 A1    10/2018

\* cited by examiner

*Primary Examiner* — Tyler J Lee
*Assistant Examiner* — Yufeng Zhang
(74) *Attorney, Agent, or Firm* — Norton Rose Fulbright US LLP; Gerard Messina

(57) ABSTRACT

A method for ascertaining a highly accurate piece of yaw rate information for controlling a vehicle is provided. The method includes ascertaining a first yaw rate estimated value of the vehicle based on a fusion of sensor data of an inertial sensor, a GNSS sensor, a wheel velocity sensor and/or a steering angle sensor; ascertaining a second yaw rate estimated value of the vehicle by an evaluation of sensor data of a camera assigned to the vehicle, which optically detects the surroundings of the vehicle; carrying out a correction of the first yaw rate estimated value with the aid of the second yaw rate estimated value to ascertain a corrected yaw rate estimated value; and outputting the corrected yaw rate estimated value as a piece of yaw rate information to generate a control signal for controlling the vehicle.

8 Claims, 3 Drawing Sheets

METHOD AND DEVICE FOR ASCERTAINING A HIGHLY ACCURATE ESTIMATED VALUE OF A YAW RATE FOR CONTROLLING A VEHICLE

CROSS REFERENCE

The present application claims the benefit under 35 U.S.C. § 119 of German Patent Application No. DE 102019215026.8 filed on Sep. 30, 2019, which is expressly incorporated herein by reference in its entirety.

FIELD

The present invention relates to a method and a control device for ascertaining a highly accurate piece of yaw rate information for controlling a vehicle. The present invention further relates to a computer program for carrying out the aforementioned method as well as a computer-readable memory medium including a corresponding computer program.

BACKGROUND INFORMATION

The information about the instantaneous yaw rate of a vehicle is needed in different automotive application areas. For example, the yaw rate is an important parameter in different control systems for guiding the vehicle during high precision parking operations or in the context of automated driving in general. In principle, a piece of information relating to the yaw rate of a vehicle should be present in any driving situation in which the relevant vehicle may be placed. In automated driving, in particular, it is necessary to ensure a very high accuracy of the yaw rate at every point in time. If the vehicle is in autonomous mode, which is characterized by the lack of any intervention by a human driver, the estimated values of the yaw rate must meet the required accuracies at all times. Indeed, in autonomous mode, it must always be possible to carry out an emergency stop of the vehicle, for example, in the case of a failure of a relevant control unit.

The yaw rate of the vehicle may be measured directly with the aid of a suitable inertial measurement unit (IMU). However, an inertial measurement unit of this type has significant uncertainties in different situations, so that the particular measured values do not always meet the strict requirements of autonomous driving. Due to these uncertainties, multiple information sources are used to increase the quality of the signal. The present methods for estimating yaw rates use, among other things, wheel-individual wheel velocities, accelerations, rotation rates, GNSS data as well as GNSS correction data. These variables are related to each other using special methods and fused with each other, for example using a special algorithm, for the purpose of preferably precisely estimating the yaw rate in every driving situation. The problem is to ensure the accuracy of the yaw rate estimate even if the data supplied by the sensors is not available in sufficient quality. The variables measured with the aid of the inertial measurement unit, such as accelerations or rotation rates, may thus have significant uncertainties, which are attributable, for example, to thermal drift of the relevant sensors. Furthermore, the position data ascertained with the aid of the GNSS sensor and the associated GNSS correction data may not be available in sufficient quality, due to reception difficulties. This is frequently the case, in particular in urban areas, where the many and tall buildings result in reflections and thus in a poor reception of the GNSS signals and correction data signals. If, in addition, extreme physical effects occur in a case of this type, for example a high temperature increase, the inertial sensors may also have significant uncertainties.

SUMMARY

An object of the present invention is to provide a possibility for correcting the yaw rate estimate, which is calculated, in particular, from a fusion of the data of the inertial measurement unit and GNSS, in situations with significant uncertainties of the corresponding sensors. This object may be achieved by an example method in accordance with the present invention. The object is further achieved by an example control unit in accordance with the present invention, an example computer program in accordance with the present invention, as well as by an example computer-readable memory medium in accordance with an example embodiment of the present invention. Further advantageous specific embodiments of the present invention are described herein.

According to the present invention, an example method is provided for ascertaining a highly accurate piece of yaw rate information for controlling a vehicle, a first yaw rate estimated value of the vehicle being ascertained based on a fusion of sensor data of a GNSS sensor, an inertial sensor, a wheel velocity sensor and/or a steering angle sensor. In a further method step, a second yaw rate estimated value of the vehicle is carried out by an evaluation of sensor data or a camera assigned to the vehicle, which optically detects the surroundings of the vehicle. In a subsequent method step, a correction of the first yaw rate estimated value is carried out with the aid of the second yaw rate estimated value to ascertain a corrected yaw rate estimated value. Finally, the corrected yaw rate estimated value is output as the piece of yaw rate information to generate a control signal for controlling the vehicle. Due to the use of the second yaw rate estimated value ascertained with the aid of the optical detection of the surroundings for correcting the first yaw rate estimated value ascertained by sensor fusion, it is possible to achieve a highly accurate piece of yaw rate information. Due to the piece of yaw rate information obtained in this manner, the high accuracy of the relevant control signals, which is needed, in particular, for the autonomous driving mode, is ensured at all times. Moreover, the method used makes it possible to ensure a sufficiently high accuracy of the yaw rate to carry out emergency measures, for example an emergency stop of the vehicle, even if individual sensors fail.

In one specific embodiment of the present invention, it is provided that the first yaw rate estimated value is compared with the second yaw rate estimated value to ascertain a yaw rate correction value. The yaw rate correction value is subsequently used to correct the first yaw rate estimated value. A yaw rate correction value ascertained in this way is a variable which essentially reflects the instantaneous error of the first yaw rate estimated value. The time development of this error facilitates a statement on whether the error is a constant deviation or an induced deviation, for example due to a thermal drift of a sensor signal. This information, in turn, may be used to ascertain a corrected yaw rate estimated value even if the second yaw rate estimated value is temporarily absent.

In a further specific embodiment of the present invention, it is provided that an offset of the first yaw rate estimated value with respect to the second yaw rate estimated value is ascertained as the yaw rate correction value. The yaw rate correction value is offset against the first yaw rate estimated value to ascertain the corrected yaw rate estimated value. This procedure permits a particularly easy correction of the yaw rate estimated value.

In a further specific embodiment of the present invention, it is provided that the second yaw rate estimated value is ascertained with the aid of a time delay relative to the first yaw rate estimated value. The first yaw rate estimated value is temporarily stored. To ascertain the yaw rate correction value, the temporarily stored first yaw rate estimated value is furthermore read out and compared with an instantaneous, ascertained second yaw rate estimated value. Due to the temporary storage of the first yaw rate estimated value, the time offset between the two yaw rate estimated values may be particularly easily compensated for. The yaw rate correction value ascertained in this way then also has a time offset with respect to the instantaneous, ascertained first yaw rate estimated value. However, this is generally not a problem in the case of constant errors of the first yaw rate estimated value and may also be taken into account by computation, even in the case that the error undergoes a change due to a thermal drift.

According to a further specific embodiment of the present invention, the second yaw rate estimated value is used to establish the plausibility of the first yaw rate estimated value. A monitoring of the sensors used for the sensor fusion as well as the corresponding sensor fusion device may be particularly advantageously implemented hereby. A flawless function of the involved components may thus be ensured.

In a further specific embodiment of the present invention, it is provided that the yaw rate correction value last ascertained is stored. If no instantaneous yaw rate correction value is available, the yaw rate correction value last ascertained is read out again and used to correct the first yaw rate estimated value. A corresponding correction of the first yaw rate estimated value is possible hereby, even if the corresponding components fail, such as the correction value ascertainment device, the corresponding device for ascertaining the second yaw rate estimated value or the camera system.

According to a further specific embodiment of the present invention, in the case that the sensor data of the camera is not available or not available in sufficiently high quality, the first yaw rate estimated value is furthermore output as the piece of yaw rate information to generate a control signal for controlling the vehicle. In this way, a still usable piece of yaw rate information may be provided even in the case of a failure of the camera or a component ascertaining the second yaw rate estimated value from the sensor data of the camera.

According to a further aspect of the present invention, an example control device for ascertaining a highly accurate piece of yaw rate information for controlling a vehicle is provided, which is configured to carry out at least a part of the steps of the method described above.

According to another aspect of the present invention, an example computer program, which includes commands, is provided, which, when the computer program is executed on a computer, prompts the latter to carry out the method described above.

Finally, according to a further aspect of the present invention, an example computer-readable memory medium is provided, on which the aforementioned computer program is stored. The implementation of the method described above in the form of a computer program offers a particularly high flexibility.

The present invention is explained in greater detail below on the basis of figures.

DETAILED DESCRIPTION OF EXAMPLE EMBODIMENTS

Figure 1:
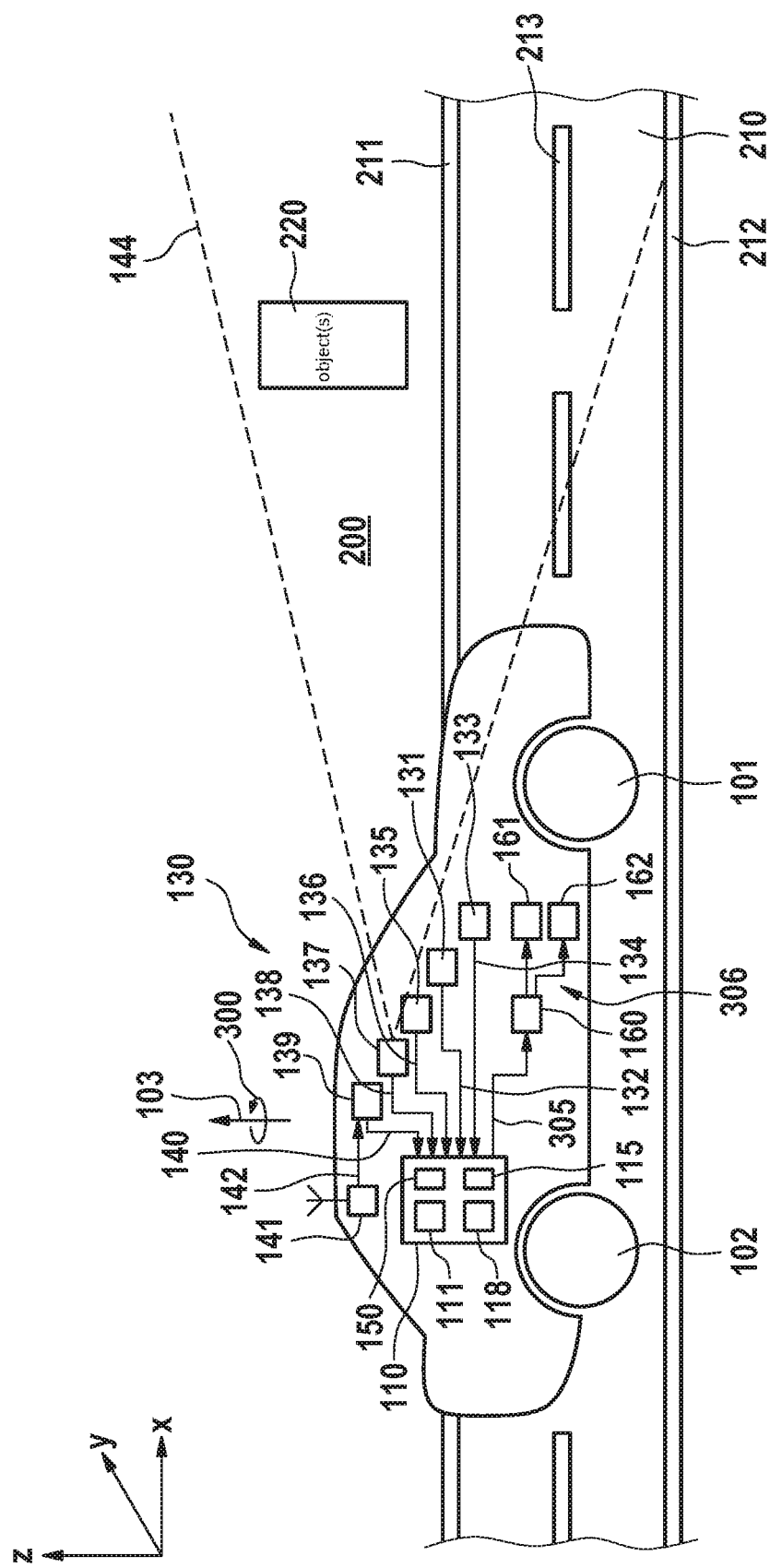
FIG. 1 schematically shows a vehicle, including sensors, for ascertaining certain variables, as well as a control device for ascertaining an estimated value of the yaw rate of the vehicle, based on the ascertained variables, in accordance with an example embodiment of the present invention.

FIG. 1 schematically shows a vehicle 100, which is on a road 210 in surroundings 200. Vehicle 100, which is preferably designed in the form of an automated vehicle, includes a sensor device 130 including a number of different sensors 131, 133, 135, 137, 139, 141 for detecting certain vehicle parameters as well as its surroundings 200. In particular, sensor device 130 includes in the present case an inertial measurement unit including at least one inertial sensor 131 for detecting acceleration and/or rotational movements of vehicle 100, a wheel velocity sensor system including preferably multiple wheel velocity sensors 133 for detecting the rotational speed of individual wheels 101, 102, as well as a steering angle sensor 135 for detecting the instantaneous steering angle. In addition, vehicle 100 also includes a GNNS sensor 137 for position determination during a satellite-supported navigation as well as a correction data receiver 139 for receiving corresponding GNNS correction data 140. Sensor device 130 further includes at least one camera 141 for optically detecting vehicle surroundings 200. Camera 141, which is designed in the present example in the form of a front camera, has a forward-directed detection area 144 and thus detects the section of road 210 situated ahead of vehicle 100, including corresponding road markings 211, 212, 213 as well as objects 220 arranged ahead of vehicle 100.

As is shown in FIG. 1, vehicle 100 further includes a control device 110 for controlling certain functions. Control device 110 is designed to evaluate data 132, 134, 136, 138, 140, 142 provided by different components 131, 133, 135, 137, 139, 141 and to provide a piece of yaw rate information based on this evaluation for controlling vehicle 100. In particular, control device 110 is designed to output suitable signals 305 to at least one actuator control unit 160, which prompt the latter to generate corresponding control signals 306 for activating certain actuators 161, 162 of vehicle 100.

As is shown as an example in FIG. 1, storage device 110 also includes a computer-readable memory medium 118, on which a computer program may be stored for carrying out the method described here.

Vehicle 100 is preferably designed as an automated vehicle 100, which is typically able to carry out at least a part of its driving tasks automatically. Depending on the level of autonomy, automated vehicle 100 provides the driver only with assistance functions (SAE Levels 1 and 2) or automatically carries out the longitudinal and transverse guidance entirely without human intervention (SAE Levels 3 through 5). However, in vehicles of autonomy levels SAE Levels 4 and 5, in particular, which make do without a driver, a very robust sensor set is extremely important to move the vehicle safely within its surroundings.

For this reason, critical parameters of vehicle 100 are ascertained by a joint evaluation of the sensor data of multiple sensors. In this way, it is ensured that the parameters ascertained on the basis of the sensor data have the necessary accuracy. Yaw rate 300 of the vehicle, i.e., the rotation of vehicle 100 around its vertical axis 103, may thus be generally measured directly with the aid of a suitable inertial measurement unit (IMU). However, corresponding inertial sensors 131 have significant uncertainties in different situations, so that the particular measured values do not always meet the strict requirements of autonomous driving. Due to these uncertainties, multiple information sources are used in vehicle 100 to increase the quality of the yaw rate information. Since different sensors, for example inertial sensors, GNSS sensors, wheel velocity sensors, steering angle sensors, etc., have, in part, complementary characteristics, a simultaneous use of multiple of these sensors for determining yaw rate 300 is sensible. Estimated values of yaw rate 300 are typically ascertained from a fusion of inertial sensors 131 with other sensors, in particular a GNSS sensor 137 for satellite-supported navigation, wheel velocity sensors 133 and/or a steering angle sensor 135. A corresponding fusion algorithm is used for the sensor fusion, for example a Kalman filter, which is suitably implemented in control device 110. The more accurately yaw rate 300 may be determined, the higher is the performance achieved by the systems and algorithms dependent thereon.

However, sensor data 132, 134, 136, 138, 140 used for the sensor fusion is subject to different uncertainties, which are attributable to typical effects for the particular sensor type. Thus, the receipt of the GNSS signal by GNSS sensor 141 as well as the receipt of the correction data signal by correction data receiver 150 may be corrupted by topographical conditions. Moreover, sensor data 134 of inertial sensors 133 may have, in part, significant uncertainties due to temperature changes.

According to an example embodiment of the present invention, a camera-based yaw rate estimation is therefore used to improve the accuracy of the sensor-based yaw rate estimation. Since the camera-based yaw rate estimation is less temperature-sensitive, it is a more reliable information source for ascertaining the yaw rate.

Figure 2:
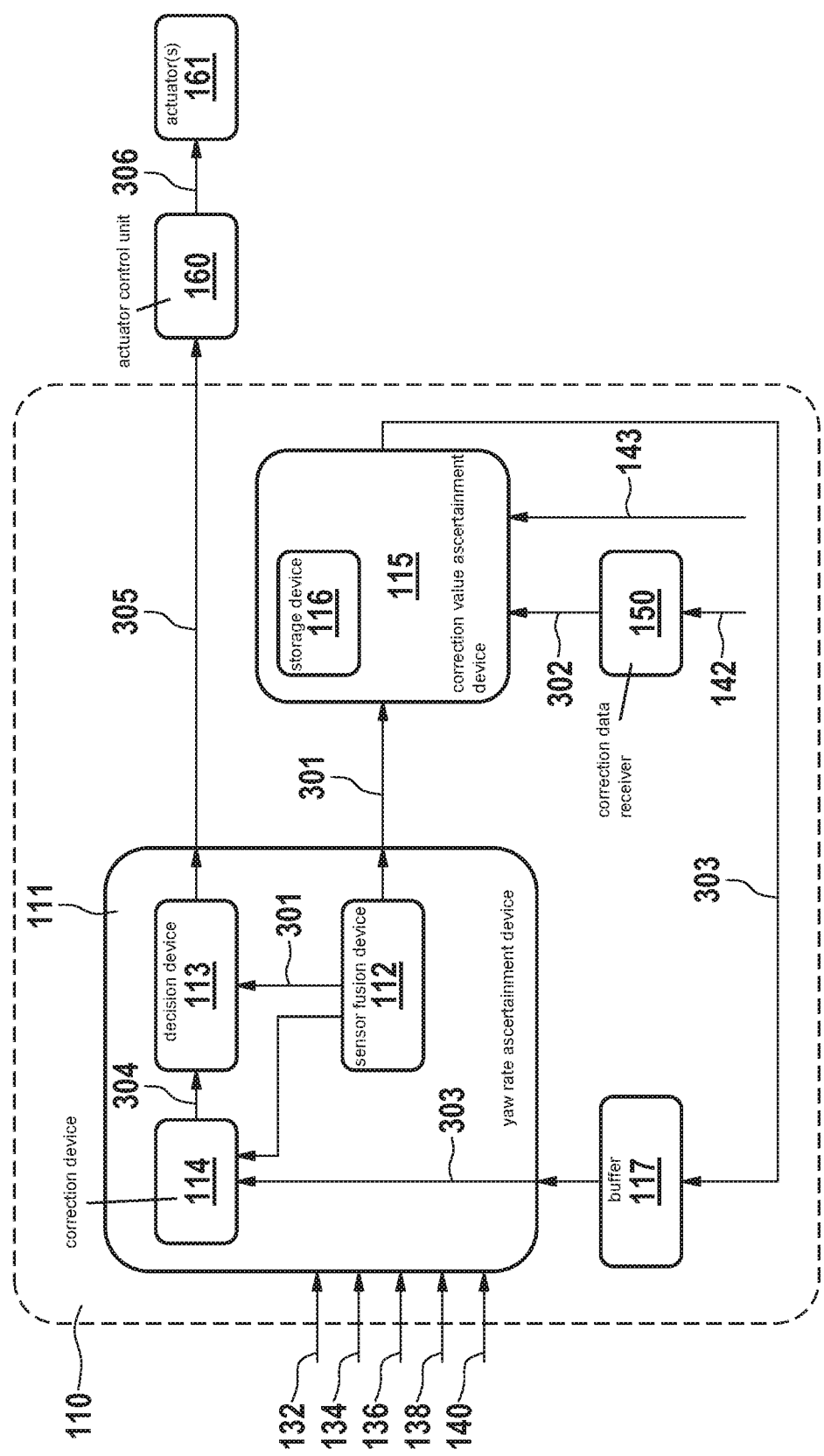
FIG. 2 shows a block diagram of a control device of the vehicle for ascertaining a corrected yaw rate estimated value, based on a camera-based yaw rate estimated value in accordance with an example embodiment of the present invention.

FIG. 2 schematically shows a detailed view of control device 110 of vehicle 100 from FIG. 1. Control device 110 includes a yaw rate ascertaining device 111 for ascertaining a highly accurate piece of yaw rate information, a computing device 150 for ascertaining camera-based yaw rate estimated value 302, based on sensor data 142 of camera 141, a correction value ascertainment device 115 for ascertaining a yaw rate correction value 303 as well as optionally a buffer 117 for the temporary storage of yaw rate correction value 303. Yaw rate ascertainment device 111 includes a sensor fusion device 112 for ascertaining a first yaw rate estimated value 301, a correction device 114 for ascertaining a corrected yaw rate estimated value 304 as well as a decision device 113 used to output a piece of yaw rate information. Yaw rate ascertainment device 111 initially ascertains a first yaw rate estimated value 301 with the aid of a suitable fusion algorithm, based on sensor data 132, 134, 136, 138 received from sensors 131, 133, 135, 137. Yaw rate ascertainment device 111 then outputs ascertained first yaw rate estimated value 301 to correction device 114, to decision device 113 as well as to correction value ascertainment device 115. In parallel to ascertaining first yaw rate estimated value 301, computing device 150 ascertains a second yaw rate estimated value 302, based on sensor data 142 of camera 140, and also outputs it to correction value ascertainment device 115. Correction value ascertainment device 115 subsequently ascertains a possible deviation of first yaw rate estimated value 301 from the actual value of yaw rate 300, based on first yaw rate estimated value 301 as well as second yaw rate estimated value 302, and subsequently generates a yaw rate correction value 303 corresponding to the ascertained deviation, which is then output to correction device 114 similarly to first yaw rate estimated value 301. Since second yaw rate estimated value 302 has a certain time delay with respect to first yaw rate estimated value 301 ascertained by the sensor fusion during the evaluation of sensor data 142 provided by camera 141, due to the relatively high amount of computing time required, first yaw rate estimated value 301 may be delayed by a corresponding period of time before it is compared with second yaw rate estimated value 302 within correction value ascertainment device 115. This may take place, for example, by a temporary storage of first yaw rate estimated value 301 in a suitable storage device 116, from which it is read out again after the expiry of a defined time. In FIG. 2, a storage device 116 of this type is situated within correction value ascertainment device 115. In principle, however, the storage device may be provided in a different location of control device 110, e.g., within yaw rate ascertainment device 111.

Once first yaw rate estimated value 301 and correction value 303 are present in correction device 114, the latter carries out a correction of first yaw rate estimated value 301 and outputs the corresponding correction value to decision device 113 in the form of a corrected yaw rate estimated value 104. Decision device 113 decides which of the two yaw rate correction values 301, 304 is output in the form of a piece of yaw rate information 305, based on predefined criteria. In particular, decision device 113 may output corrected yaw rate estimated value 304 as piece of yaw rate information 305 in the case that a significant deviation is established between first yaw rate estimated value 301 and corrected yaw rate estimated value 304. However, decision device 113 may output somewhat more recent first corrected yaw rate estimated value 301, compared to corrected yaw rate estimated value 304, as piece of yaw rate information 305 in the case that no deviation or only a slight deviation is established between first yaw rate estimated value 301 and corrected yaw rate estimated value 304.

As is shown in FIG. 2, piece of yaw rate information 305 ascertained in such a way may be transmitted to at least one actuator control device 160, which generates a control signal 306 based on this information for activating an actuator 161 of vehicle 100.

Control device 110 may also optionally include a buffer 117 for the temporary storage of yaw rate correction value 303. As is illustrated as an example in FIG. 2, this buffer may be situated between correction value ascertainment device 115 and yaw rate ascertainment device 111 or also be formed as part of one of these components.

A yaw rate correction value 303 stored in buffer 117 may be output again from buffer 117 in the case of a temporary non-availability of an instantaneous yaw rate correction value 303 and be used for the correction of first yaw rate estimated value 301 by correction device 114.

Control device 110 is typically implemented in the form of hardware. However, at least one part of the functions of control device 110 described in connection with FIG. 2 may be implemented in the form of hardware, software or a mixture of hardware and software, depending on the application. An implementation of corresponding functions in the form of hardware makes for a particularly efficient operation. However, an implementation of the corresponding functions in the form of software provides a particularly high flexibility.

Figure 3:
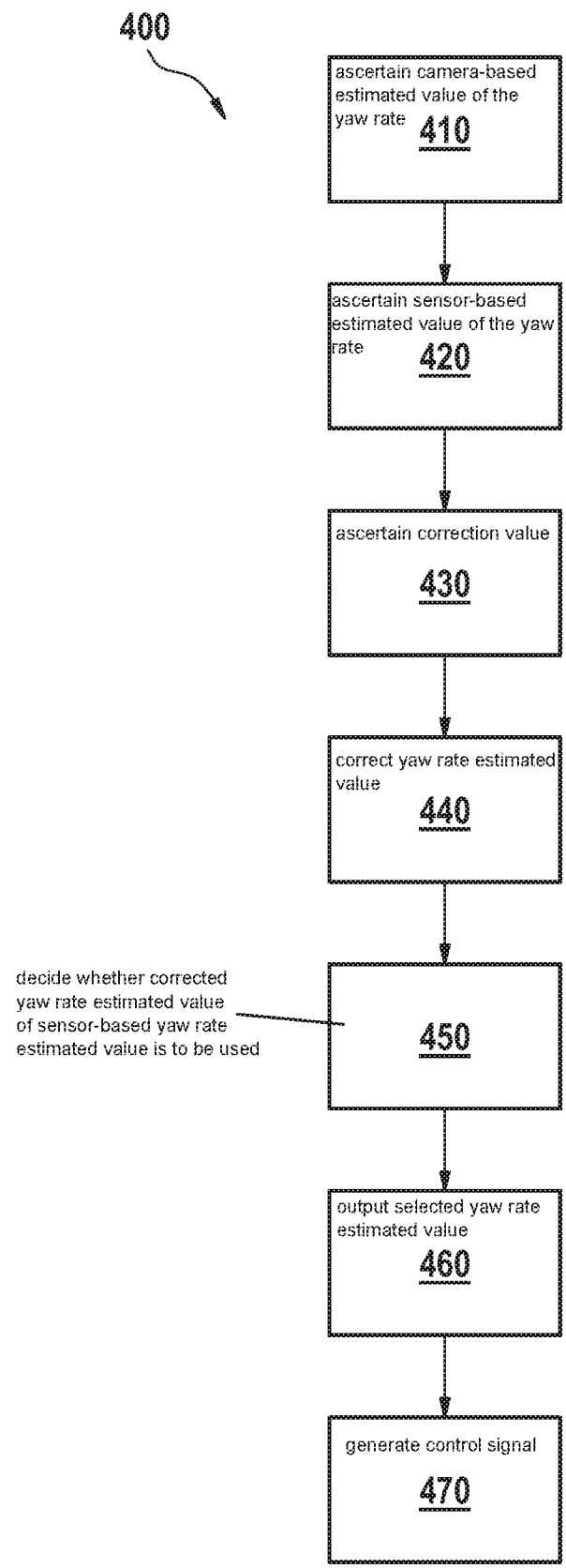
FIG. 3 schematically shows a flowchart of a method for correcting the yaw rate estimated value ascertained by sensor fusion with the aid of the yaw rate estimated value ascertained from the optical detection of the surroundings, in accordance with an example embodiment of the present invention.

A simplified flowchart 400 is illustrated in FIG. 3 for clarifying the example method. A camera-based estimated value of the yaw rate of the vehicle is ascertained in a method step 410. This takes place by a detection of objects and/or structures within surroundings 400 of vehicle 100 with the aid of at least one camera 130 situated at the vehicle side and a subsequent evaluation of the data obtained. In a method step 420, a sensor-based estimated value of the yaw rate of the relevant vehicle is ascertained, based on a sensor fusion. For this purpose, sensor data are initially detected with the aid of various sensors of vehicle 100, and the sensor-based estimated value of the yaw rate is subsequently ascertained by a fusion of the detected sensor data. In a method step 430, a correction value 303 for sensor-based yaw rate estimated value 301 is ascertained, based on sensor-based yaw rate estimated value 301 as well as camera-based yaw rate estimated value 302. This takes place, for example, by a comparison of sensor-based yaw rate estimated value 301 with camera-based yaw rate estimated value 302. A corrected yaw rate estimated value 304 is ascertained in a further method step 440. This typically takes place by offsetting sensor-based yaw rate estimated value 301 against yaw rate correction value 303. In a further method step 450, it is decided whether corrected yaw rate estimated value 304 or sensor-based yaw rate estimated value 301 is to be used as the piece of yaw rate information. In a further method step 460, particular selected yaw rate estimated value 301, 304 is then output in the form of a piece of yaw rate information. Finally, at least one control signal 306 is generated in a further method step 470 for controlling vehicle 100, based on the output piece of yaw rate information.

In the example embodiment of the present invention described here, a camera-based yaw rate estimation is used to improve the accuracy of the sensor-based yaw rate estimation. Since the camera-based yaw rate estimation is less temperature-sensitive, it is a more reliable information source for ascertaining the yaw rate. However, the camera-based yaw rate estimation has a relatively high time delay, due to the computationally intensive camera data processing. As a result, the yaw rate estimated value ascertained on the basis of the camera may not be used directly for fusion with the other yaw rate sources but instead is very well suited to correct sensor uncertainties, on which sensor-based yaw rate estimated value 301 is based. For example, if the yaw rate estimated value shows a high offset from the fusion algorithm, the latter may be detected by a comparison with the camera-based yaw rate estimated value in a correction algorithm. If a high quality of the camera information is ensured during this period of time, a correction of the sensor fusion-based yaw rate estimated value may be carried out. For example, if a correction value is present from the correction algorithm, it may be used, in particular, during a non-availability of the GNSS signal, if the camera information is absent (e.g., if lane lines are not present or not detected) or even if one of these components fails. In a further use, instead of corrected yaw rate estimated value, the sensor-based yaw rate estimated value is used, which was previously offset against the yaw rate correction value.

In addition to a greater estimation accuracy, a further advantage results by ensuring the yaw rate accuracy during a failure of the camera and/or a GNSS reception interference. This is important, above all, if the failure or the interference continues over long distances. This may be the case in an autonomous emergency stop. An activation of this function takes place, for example, if one or multiple hardware errors occur. In a scenario of this type, only a few sensors are available for determining the yaw rate, whereby the correction value takes on enormous importance.

The features according to the present invention described here include the correction of uncertainties of a highly accurate yaw rate estimation with the aid of camera information. Uncertainties of this type may occur, due to a varied sensitivity of the different sensor data. The accuracy of inertial data is thus typically dependent on the temperature. However, the GNSS sensor data is generally very inaccurate in cities, since the reception of the GNSS signals is interfered with by reflections on buildings. In the near future, additional sensors must be used for fusion or for correction so that an autonomous vehicle may also be located in cities and under extreme temperatures. The fusion of the sensor data of the inertial measurement unit with the sensor data or the GNSS sensors as well as the correction data is used as a basis for the yaw rate estimation. In situations of high uncertainty of the estimated yaw rate, the estimated yaw rate is checked for plausibility and corrected with the aid of camera information.

Although the present invention is illustrated and described in greater detail by the preferred exemplary embodiments, the present invention is not limited by the described examples. Instead, other variations may be derived therefrom by those skilled in the art without departing from the scope of the present invention.

What is claimed is:

1. A method for ascertaining a highly accurate piece of yaw rate information for controlling a vehicle, comprising the following steps:
    ascertaining a first yaw rate estimated value of the vehicle, based on a fusion of sensor data of an inertial sensor, and/or a GNSS sensor, and/or a wheel velocity sensor and/or a steering angle sensor;
    ascertaining a second yaw rate estimated value of the vehicle by an evaluation of sensor data of a camera assigned to the vehicle, which optically detects surroundings of the vehicle;
    carrying out a correction of the first yaw rate estimated value using the second yaw rate estimated value to ascertain a corrected yaw rate estimated value; and
    outputting the corrected yaw rate estimated value as a piece of yaw rate information to generate a control signal for controlling the vehicle, wherein:
    the first yaw rate estimated value is compared with the second yaw rate estimated value to ascertain a yaw rate correction value, and wherein the yaw rate correction value is used to correct the first yaw rate estimated value,
    the second yaw rate estimated value is ascertained with a time delay relative to the first yaw rate estimated value, the first yaw rate estimated value being temporarily stored, and
    the temporarily stored first yaw rate estimated value is read out and compared with an instantaneous, ascertained second yaw rate estimated value for ascertaining the yaw rate correction value.

2. The method as recited in claim 1, wherein an offset of the first yaw rate estimated value with respect to the second yaw rate estimated value is ascertained as the yaw rate correction value, and the yaw rate correction value is offset against the first yaw rate estimated value to ascertain the corrected yaw rate estimated value.

3. The method as recited in claim 1, wherein the second yaw rate estimated value is used to check plausibility of the first yaw rate estimated value.

4. The method as recited in claim 1, wherein the yaw rate correction value last ascertained is stored, and the yaw rate correction value last ascertained being read out and used to correct the first yaw rate estimated value in a case that no instantaneous yaw rate correction value is available.

5. The method as recited in claim 1, wherein an availability and quality of the sensor data of the camera is monitored, and wherein the yaw rate correction value is ascertained and/or used for correcting the first yaw rate estimated value only when the sensor data of the camera is available and has a predetermined quality.

6. The method as recited in claim 5, wherein the first yaw rate estimated value is output as the piece of yaw rate information to generate a control signal for controlling the vehicle in a case that the sensor data of the camera are not available or not available according to a predetermined quality.

7. A control device for ascertaining a highly accurate piece of yaw rate information for controlling a vehicle, the control device configured to:
- ascertain a first yaw rate estimated value of the vehicle, based on a fusion of sensor data of an inertial sensor, and/or a GNSS sensor, and/or a wheel velocity sensor and/or a steering angle sensor;
- ascertain a second yaw rate estimated value of the vehicle by an evaluation of sensor data of a camera assigned to the vehicle, which optically detects surroundings of the vehicle;
- carry out a correction of the first yaw rate estimated value using the second yaw rate estimated value to ascertain a corrected yaw rate estimated value; and
- output the corrected yaw rate estimated value as a piece of yaw rate information to generate a control signal for controlling the vehicle, wherein:
- the first yaw rate estimated value is compared with the second yaw rate estimated value to ascertain a yaw rate correction value, and wherein the yaw rate correction value is used to correct the first yaw rate estimated value,
- the second yaw rate estimated value is ascertained with a time delay relative to the first yaw rate estimated value, the first yaw rate estimated value being temporarily stored, and
- the temporarily stored first yaw rate estimated value is read out and compared with an instantaneous, ascertained second yaw rate estimated value for ascertaining the yaw rate correction value.

8. A non-transitory computer-readable memory medium on which is stored a computer program ascertaining a highly accurate piece of yaw rate information for controlling a vehicle, the computer program, when executed by a computer, causing the computer to perform the following steps:
- ascertaining a first yaw rate estimated value of the vehicle, based on a fusion of sensor data of an inertial sensor, and/or a GNSS sensor, and/or a wheel velocity sensor and/or a steering angle sensor;
- ascertaining a second yaw rate estimated value of the vehicle by an evaluation of sensor data of a camera assigned to the vehicle, which optically detects surroundings of the vehicle;
- carrying out a correction of the first yaw rate estimated value using the second yaw rate estimated value to ascertain a corrected yaw rate estimated value; and
- outputting the corrected yaw rate estimated value as a piece of yaw rate information to generate a control signal for controlling the vehicle, wherein:
- the first yaw rate estimated value is compared with the second yaw rate estimated value to ascertain a yaw rate correction value, and wherein the yaw rate correction value is used to correct the first yaw rate estimated value,
- the second yaw rate estimated value is ascertained with a time delay relative to the first yaw rate estimated value, the first yaw rate estimated value being temporarily stored, and
- the temporarily stored first yaw rate estimated value is read out and compared with an instantaneous, ascertained second yaw rate estimated value for ascertaining the yaw rate correction value.

\* \* \* \* \*